US008662582B2

(12) United States Patent
Hall et al.

(10) Patent No.: US 8,662,582 B2
(45) Date of Patent: Mar. 4, 2014

(54) LATCH ANCHOR INERTIAL LOCK AND PRETENSIONER

(75) Inventors: Ian Brewster Hall, Kensington, MD (US); Brian Robert Spahn, Plymouth, MI (US); Richard Ruthinowski, Taylor, MI (US); Parakrama V. Weerappuli, West Bloomfield, MI (US); Kevin Siasoco, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 12/953,685

(22) Filed: Nov. 24, 2010

(65) Prior Publication Data

US 2012/0126597 A1 May 24, 2012

(51) Int. Cl.
*B60R 22/28* (2006.01)

(52) U.S. Cl.
USPC .................................. 297/216.11; 297/480

(58) Field of Classification Search
USPC ............ 297/216.11, 474, 475, 476, 478, 480; 280/805, 806
See application file for complete search history.

(56) References Cited

U.S. PATENT DOCUMENTS

| | | | | |
|---|---|---|---|---|
| 3,241,205 A | * | 3/1966 | Genin | 24/602 |
| 3,638,501 A | * | 2/1972 | Prachar | 73/492 |
| 3,744,814 A | | 7/1973 | Sturman | |
| 3,947,058 A | * | 3/1976 | Laporte | 297/470 |
| 4,072,348 A | * | 2/1978 | Auer | 297/470 |
| 4,373,684 A | * | 2/1983 | Naito | 242/385 |
| 4,456,196 A | * | 6/1984 | Takada et al. | 242/385 |
| 4,755,411 A | | 7/1988 | Wing et al. | |
| 5,000,515 A | | 3/1991 | Deview | |
| 5,163,708 A | * | 11/1992 | Kotama | 280/806 |
| 5,221,110 A | | 6/1993 | Hamaue | |
| 5,222,994 A | | 6/1993 | Hamaue | |
| 5,271,639 A | | 12/1993 | Nishizawa | |
| 5,290,062 A | * | 3/1994 | Fohl | 280/801.2 |
| 5,368,328 A | * | 11/1994 | Kamiyama et al. | 280/733 |
| 5,374,110 A | * | 12/1994 | Hiramatsu | 297/480 |
| 5,377,554 A | * | 1/1995 | Reulein et al. | 74/2 |
| 5,387,029 A | | 2/1995 | Hiramatsu et al. | |
| 5,607,185 A | * | 3/1997 | Isaji et al. | 280/806 |
| 5,685,603 A | * | 11/1997 | Lane, Jr. | 297/216.11 |
| 6,186,431 B1 | * | 2/2001 | Biller et al. | 242/374 |
| 6,254,183 B1 | | 7/2001 | Bian et al. | |
| 6,513,870 B1 | * | 2/2003 | Takizawa | 297/216.11 |
| 6,517,154 B2 | | 2/2003 | Sawamoto | |
| 6,767,057 B2 | | 7/2004 | Neelis | |
| 6,886,884 B2 | | 5/2005 | Bull et al. | |

(Continued)

*Primary Examiner* — David Dunn
*Assistant Examiner* — Timothy J Brindley
(74) *Attorney, Agent, or Firm* — Franklin MacKenzie; Ford Global Technologies, LLC

(57) ABSTRACT

An inertial lock system for use with an anchorage system for at least one vehicle child seat, the inertial lock system. The inertial lock system includes a retainer; an anchor movably connected to the retainer; at least one energy managing component connected between the retainer and the anchor biasing the anchor in a first direction capable of managing energy transmitted between the anchor and the retainer when the anchor is displaced in the direction opposite the first direction; a retention switch component selectively engageable with the anchor to limit the movement of the anchor in the first direction; and an inertial switch selectively operable in response to a predetermined deceleration of the retainer in the first direction to selectively release the retention switch and to thereby permit the at least one energy managing device to be displaced in the first direction.

21 Claims, 4 Drawing Sheets

(56) References Cited

U.S. PATENT DOCUMENTS

| | | |
|---|---|---|
| 7,278,684 B2 | 10/2007 | Boyle |
| 7,347,452 B2 * | 3/2008 | Maloney et al. ............ 280/801.1 |
| 7,735,934 B2 * | 6/2010 | Fuhrken et al. ................ 297/483 |
| 7,862,087 B2 * | 1/2011 | Martinovic .................... 280/805 |
| 8,328,275 B2 * | 12/2012 | Vogt et al. ................. 297/216.11 |
| 2006/0090946 A1 | 5/2006 | Zhao et al. |
| 2007/0001495 A1 | 1/2007 | Boyle et al. |
| 2007/0013215 A1 | 1/2007 | Browne et al. |
| 2007/0120001 A1 | 5/2007 | Esler et al. |
| 2008/0018085 A1 | 1/2008 | Clute |
| 2010/0109394 A1 * | 5/2010 | Ruthinowski et al. ... 297/216.11 |
| 2010/0109395 A1 * | 5/2010 | Ruthinowski et al. ... 297/216.11 |
| 2012/0001460 A1 * | 1/2012 | Ruthinowski et al. ... 297/216.11 |

* cited by examiner

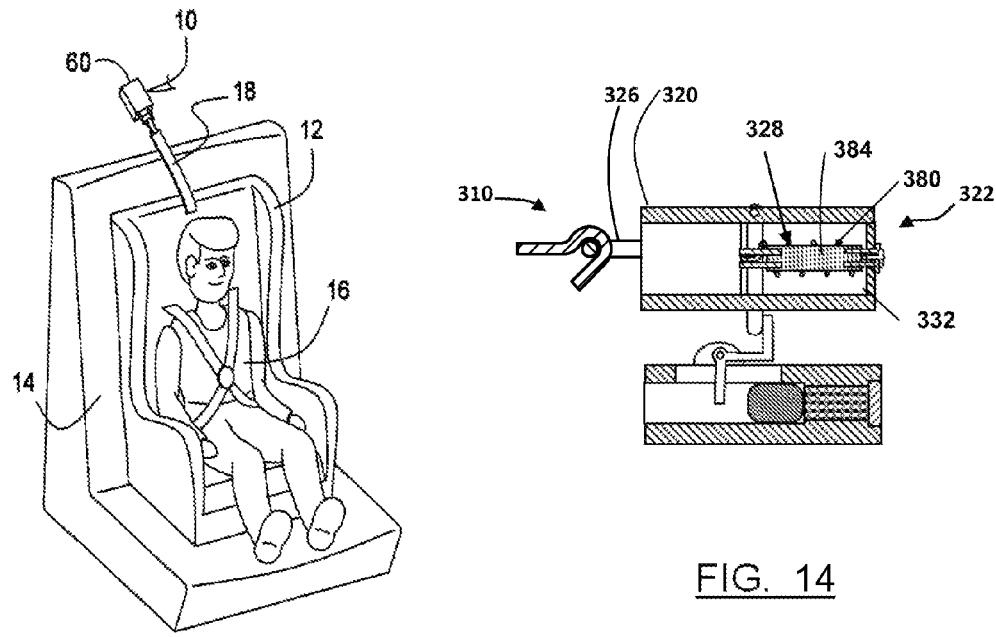
FIG. 1
FIG. 14
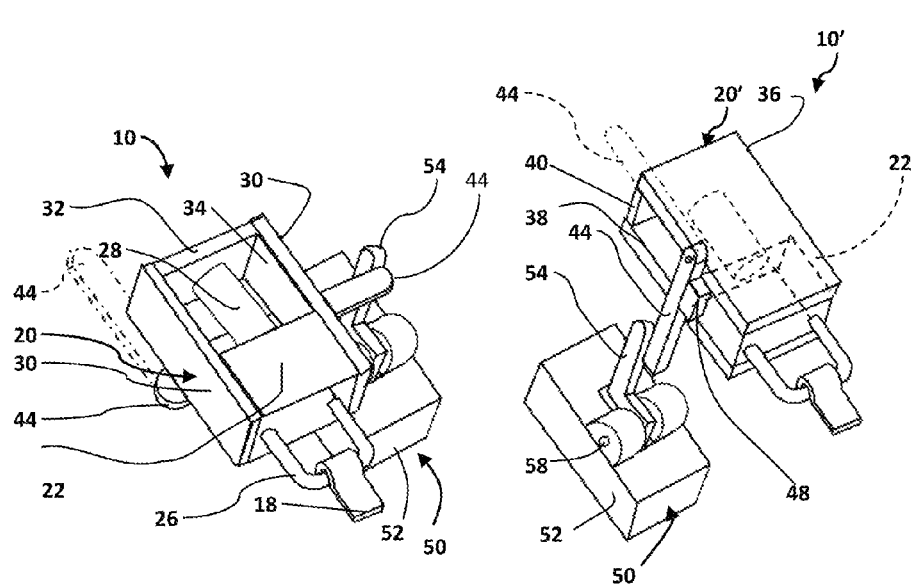
FIG. 2
FIG. 3

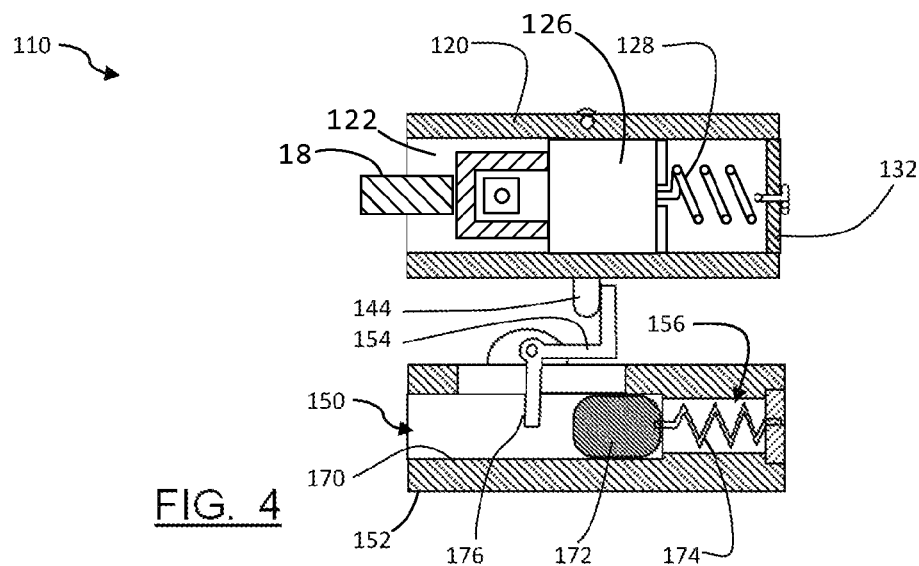
FIG. 4
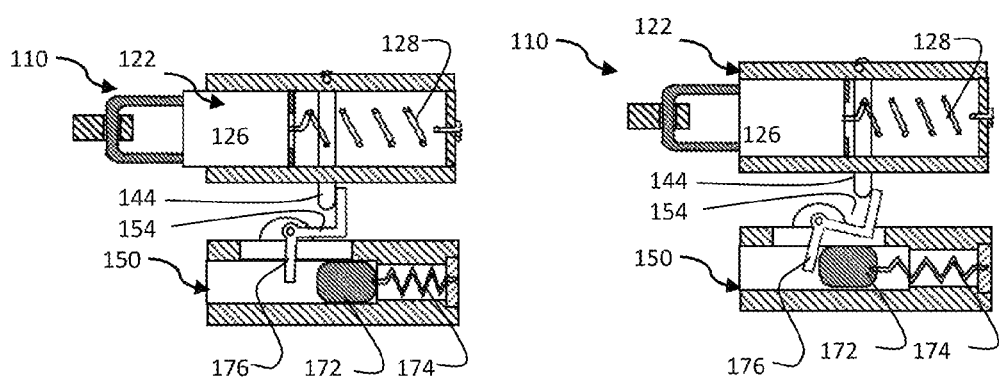
FIG. 5
FIG. 6
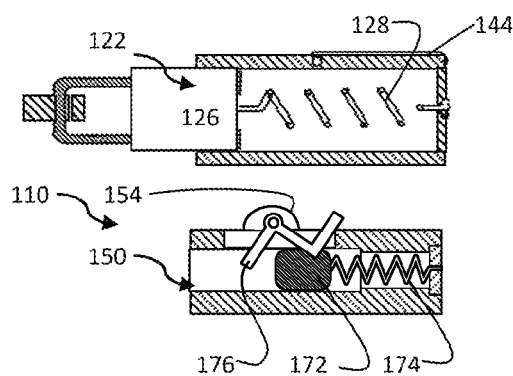
FIG. 7

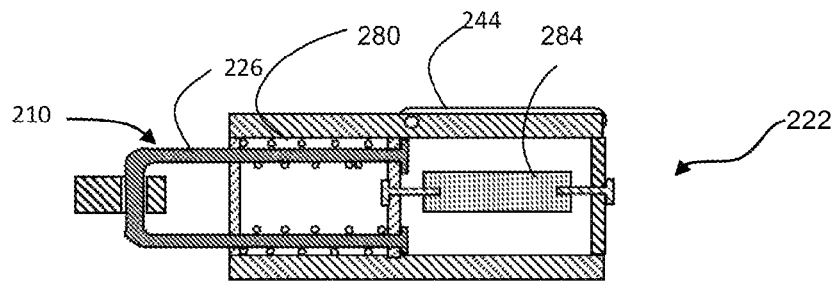
FIG. 11
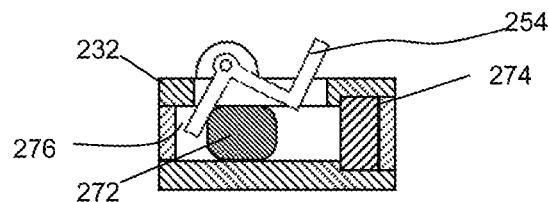
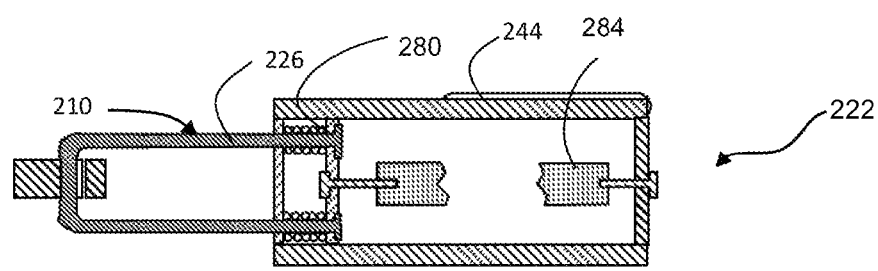
FIG. 12
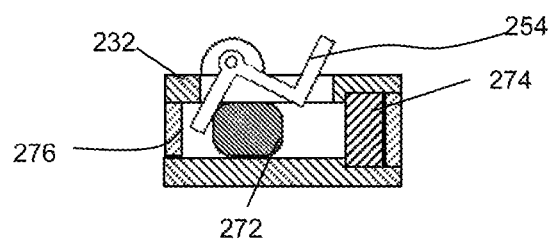
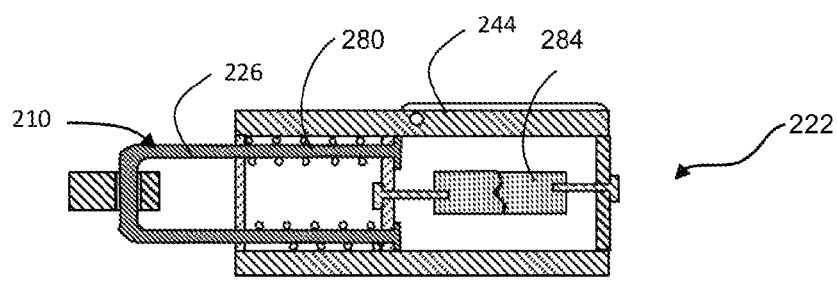
FIG. 13
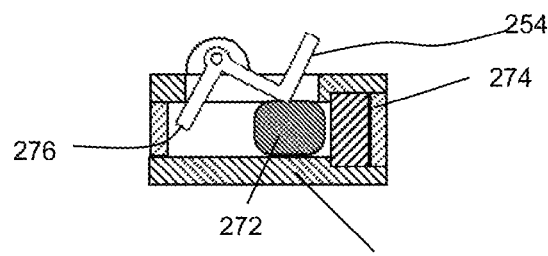

LATCH ANCHOR INERTIAL LOCK AND PRETENSIONER

BACKGROUND AND SUMMARY

In one non-limiting embodiment, the present disclosure relates to a seat restraint anchor inertial lock for use in connection with a child seat that is secured to a vehicle seat and, more particularly, to an improved restraint device or system that manages the load and displacement characteristics of one or more child seat anchors upon experiencing a predetermined change in acceleration indicative of a vehicle impact condition.

Child safety seats are routinely secured to the seat of a vehicle through conventional methods and use of such equipment as a standard vehicle seat belt and child seat attachment hardware such as tethers or straps that are generally included with, or integral to, the child seat assembly. The tethers or straps have hooks, clips, clasps and/or rigid, quick release engagement clip or claw-like mechanisms at their ends to engage the vehicle seat anchors. Standard systems routinely utilize child seat straps with quick release mechanisms for directly engaging the vehicle anchors, or a conventional child seat tether/strap or belt assembly wherein the seat belt and/or child tether/strap webbing is intertwined through brackets or guide apertures in the child seat, so that the child seat may be drawn against the vehicle seat and secured to the vehicle seats lower restraint anchors. Additionally, a top tether incorporating a tether hook, clip or clasp also engages a vehicle anchor to further secure the upper portion of the child seat to the vehicle seat. Child safety seats generally move in a car-forward direction, relative to the vehicle seat, during an abrupt vehicle deceleration or dynamic frontal vehicle impact event, causing a resulting inertial force to be impinged on the points of contact between the child seat attachment hardware and the interfacing vehicle restraint anchors. The effects of such inertial forces can be significant and thus management of these forces can be helpful to reduce the loads transferred to the seated child occupant.

It is therefore desirable to reduce occupant injury in child seats by providing a restraint anchor assembly that enhances the functional relationship between the child seat and the controlled, common points of engagement with the vehicle interior environment, in order to manage the displacement of a child seat, and the energy transferred to the child occupant, as the result of an abrupt vehicle deceleration or vehicle impact event. This may be achieved by controlling the translation and rotation of a child seat that is engaged with a vehicle's restraint anchors, subjected to the aforementioned conditions. One or more load bearing deformable energy distributing or absorbing elements are incorporated into an energy management restraint anchor assembly, or a shared energy management restraint anchor system. The deformable elements are configured to be distorted and/or displaced when subjected to restraint anchor input load conditions, thereby absorbing and redistributing restraint energy and permitting corresponding restraint anchor extraction.

Incorporation of one or more load bearing deformable members that may, when combined together or incorporated individually, exhibit a variety of material properties, cross-sectional geometries, and correspondingly unique resultant energy absorption characteristics, enhances the ability to tune the load redistribution and anchor displacement capabilities of the energy management restraint device. A wide variety of energy management characterization profiles may therefore be derived for a given restraint anchor, or combination of anchorages associated with an energy management restraint device or system, including progressive, digressive, multi-level and variable rise rate load limiting that may be achieved over a variety of predetermined anchor displacement values, thereby enabling customized load carrying and load redistribution characteristics for various occupant sizes or occupant loading conditions.

It is desirable to provide an improved energy management anchorage device or system that interfaces with the child seat attachment hardware and may be mounted to a structural or load bearing member of the vehicle seat, package tray, roof, floor, or any other desired location as permitted by law.

BRIEF SUMMARY OF THE INVENTION

In one non-limiting embodiment, the present disclosure is directed to a system and method for pre-tensioning a seat restraint anchor inertial lock for use in connection with a child seat that is secured to a vehicle seat and, more particularly, to an improved restraint device or system that manages the load and displacement characteristics of one or more child seat anchors upon experiencing a predetermined change in acceleration indicative of a vehicle impact condition.

The present disclosure includes an inertial lock device or system for use with an anchorage device or system for at least one vehicle child seat. The anchorage device or system may include one or more of the following—at least one load bearing deformable energy management member, a retainer or housing; an anchor; and a fixed-position or moveable load bearing member relative to which the deformable energy management member may be positioned or react against. The load bearing deformable member may comprise a one or more biasing members or one or more energy absorbing members or both. The inertial lock device or system may include one or more of the following—a biasing member selectively biasing the moveable load bearing member in a predetermined direction, a latch selectively securing the moveable load bearing member against movement in the predetermined direction beyond a neutral position, and an inertial switch selectively releasing the latch to permit the biasing member to displace and preload the movable load bearing member. The deformable elements are configured to be distorted and/or displaced upon activation of an inertial switch, to preload the system in the event of a predetermined level of deceleration indicative of potential collision condition.

Further areas of applicability and functional characteristics of the present invention will become apparent from the detailed description provided herein. It should be understood that the detailed description and specific examples, while indicating preferred examples of the present invention, are intended for purposes of illustration only, and various changes and modifications within the spirit and scope of the invention will become apparent to those skilled in the art from this detailed description. It will be appreciated that the present invention can be utilized in automotive, aerospace, nautical, amusement or alternative land-based personal or commercial vehicle or cargo transportation applications where it is desirable to manage the displacement of a child seat anchorage, an occupant secured to an anchorage, or where other transportable items may need to be tethered to anchorages.

BRIEF DESCRIPTION OF THE DRAWINGS

The present invention will become more fully understood from the detailed description and the accompanying drawings, wherein:

FIG. 1 is a perspective view of a child seat mounted to a vehicle seat, utilizing one example of an energy management anchorage device depicted as being operatively associated with an upper tether;

FIG. 2 is a partially schematic perspective view of a portion of one example of an energy management anchorage device with an inertial lock exposing components of the anchorage device and the inertial lock;

FIG. 3 is a partially schematic perspective view of a portion of another example of an energy management anchorage device with an inertial lock exposing components of the anchorage device and the inertial lock;

FIG. 4 is a partially schematic cutaway plan view of a portion of the anchorage device of FIG. 2, with an inertially operated latch engaged permitting the anchorage device to be preloaded by a pre-load spring;

FIG. 5 is a partially schematic cutaway plan view of the anchorage device of FIG. 4, with the anchor displaced and the preload spring partially extended against a force exerted upon the anchor by the vehicle seat, such as by a deceleration of the vehicle seat at a rate in below a predetermined deceleration rate indicative of a collision event;

FIG. 6 is a partially schematic cutaway plan view of the anchorage device of FIGS. 4 and 5, with an inertial trigger component partially displaced against the force of a trigger spring into engagement with the inertially operated latch, such as by a deceleration of the vehicle seat at a rate in excess of a predetermined rate;

FIG. 7 is a partially schematic cutaway plan view of the anchorage device of FIGS. 4-6, with an inertial trigger component fully displaced past engagement with the inertially operated latch, with the inertially operated latch released and with the anchorage device pre-loaded by the pre-load spring;

FIG. 11 is a partially schematic cutaway plan view of the anchorage device of FIGS. 8-10, with an inertial trigger component fully displaced past engagement with the inertially operated latch, with the inertially operated latch released and with the anchorage device pre-loaded by the pre-load spring;

FIG. 12 is a partially schematic cutaway plan view of the anchorage device of FIGS. 8-11, with an inertial trigger component partially restored by the trigger spring to its rest position and the anchorage device loaded against the force of the pre-load spring, such as by an occupant forward force following the deceleration of the vehicle seat;

FIG. 13 is a partially schematic cutaway plan view of the anchorage device of FIGS. 9-12, with the anchorage device restored to its rest position by the pre-load spring;

FIG. 14 is a partially schematic cutaway plan view of a portion of another alternative anchorage device, with an inertially operated latch engaged preventing the anchorage device being preloaded by a pre-load spring.

DETAILED DESCRIPTION OF THE DRAWINGS

Figure 8:
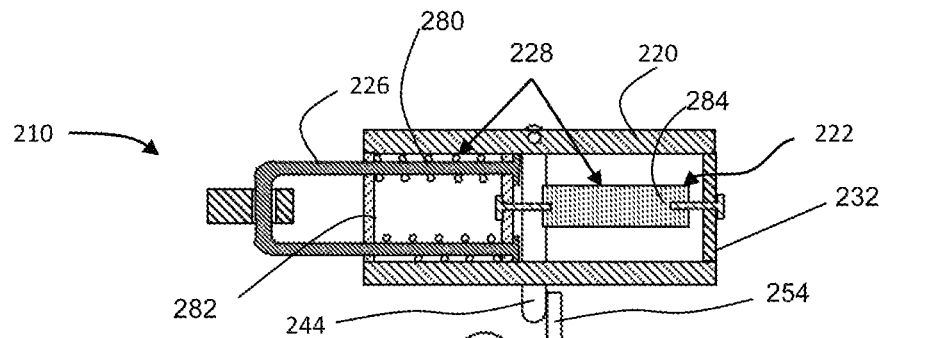
FIG. 8 is a partially schematic cutaway plan view of a portion of a first alternative anchorage device, with an inertially operated latch engaged preventing the anchorage device being preloaded by a pre-load spring.

Turning now to the drawings wherein like numbers refer to like structures, FIG. 1 illustrates an energy management anchor assembly 10, a child seat 12, a vehicle seat 14 and an occupant 16. In this example a top tether 18 is shown secured at one end to the anchor assembly 10 and at another end to the child seat 12. Energy management anchor assembly 10 may be affixed to a structural or load bearing member of the vehicle such as a package tray or roof, to the vehicle seat, to the floor or a trunk wall of the vehicle or to an alternative member in an alternative location permitted by law, to enable child seat attachment with the anchors. In this example, the device 10 is depicted in a location representing attachment to a package tray or vehicle roof. Energy management anchor assembly 10 and top tether 18 are oriented to carry a load exerted by child seat 12 generally in the direction of travel of the vehicle.

With reference to FIGS. 2 and 3, alternative anchor assemblies 10 and 10' are illustrated. It should be noted that anchor assemblies 10 and 10' may be similar to each other except as described below.

Referring now to FIG. 2, anchor assembly 10 may include an inner housing or retainer 20, relative to which at least one load bearing energy absorption system 22 may be displaced to absorb energy imparted by child seat 12 during a vehicular deceleration event.

Energy absorption system 22 includes an anchor 26 capable of being coupled to top tether 18. Energy absorption system 22 is slidably mounted to retainer 20 such as to be slidable relative to retainer 20 in the direction of motion of the vehicle. Retainer 20 may have side walls 30 and a back wall 32 defining a channel 34 for anchor 26 to be dynamically displaced. At least a partial top wall or at least a partial bottom wall, not shown in FIG. 2, may be added to provide additional structure for retainer 20, support for anchor 26, or to enclose anchor 26 within retainer 20. Retainer 20 may include one or more interlocking members, not shown, such as spring clips or elongated locking tabs extending towards anchor 26, from side walls 30 or a front and back wall, not shown, to limit the movement of anchor 26 relative to retainer 20.

Energy absorption system 22 further includes one or more load managing members 28 connected between anchor 26 and retainer 20. As described in detail herein below, load managing member 28 may be a return assist component such as a coil spring capable of resiliently storing the energy of a deceleration event. Load managing member may alternatively be an energy dissipating component. A plurality of load managing members 28 may be used, such as one or more anchor biasing return assist components and one or more energy dissipating components disposed in parallel or series or variation therefrom.

Anchor 26 may also include a child seat tether hook, clasp, clip or quick connect claw-like mechanism, not shown, to removably attach to anchor 26 to top tether 18.

Alternatively, as shown in FIG. 3, retainer 20' may have a top wall 36, a bottom wall 38 and a back wall 40. One or two partial or complete side walls, not shown in FIG. 3, may be added. Still other configurations are possible including retainers 20 substantially completely enclosing anchor 26 as well as enclosures having different cross-sections, such as a circular cross-section.

Referring generally to FIGS. 2 and 3, a lever 44 may be pivotably mounted by a suitable pin 46, visible only in FIG. 3, to a side wall 30 of retainer 20 or to a top wall 36 of retainer 20' such as to be pivotable between two positions. In a first position of lever 44, shown in solid line in FIGS. 2 and 3, lever 44 extends transversely to the direction of motion of the vehicle. In a, second position, shown in phantom line, lever 44 extends parallel to the direction of motion of the vehicle. A biasing member, not shown, such as a spring, is interposed between lever 44 and retainer 20 or 20' to bias lever 44 into the second position. When in the first position, lever 44 engages an abutment 48, visible only in FIG. 3, extending from anchor 26 such as to selectively limit the displacement of anchor 26 towards the front of the vehicle. When lever 44 is in the first position, energy managing member 28 biases the anchor towards the rear of the vehicle such that abutment 48 engages lever 44 unless the anchor experiences a force from top tether 18 sufficient to overcome the force of energy managing member 28, in which event anchor 26, and thus abutment 48, may be selectively moved away from lever 44. When lever 44 is in the second position, it is no longer engageable with abutment 48 and anchor 26 is free to move under the influence of the energy managing member 28 towards the rear of the vehicle, thereby pretensioning top tether 18, as will be described in greater detail later herein.

Lever 44 is selectively held in the first position by a switch assembly 50 disposed adjacent retainer 20. Switch assembly 50 has an inner housing or retainer 52 and an inertial switching system not shown in FIGS. 2 and 3 but described shortly hereinbelow with reference to FIGS. 4-17, connected to drive a lever 54 pivotally mounted to retainer 52, such as by pin 58, shown only in FIG. 3. One end of lever 54 selectively engages one end of lever 44 to selectively hold lever 44 in the first position. The inertial switching system is selectively operable, in a manner to be described shortly, to selectively pivot lever 54 away from engagement with lever 44 and thereby permit lever to be displaced to the second position and permit energy managing member 28 to pretension top tether 18. Switch assembly 50 may be positioned such that lever 54 is perpendicular to lever 44, as shown in FIG. 2, or parallel to lever 44, as shown in FIG. 3, depending on the space available and functional needs.

It will be appreciated that anchor assembly 10 or 10' may be self contained. Retainer 20 or 20' or switch assembly 50 may have only few wall surfaces that do not entirely encapsulate their components or may be enclosed. Retainer 20 or 20' and switch assembly 50 may be at least partially enclosed together by an outer housing such as outer housing, shown only in FIG. 1. Furthermore, outer housing may serve to at least partially secure, orient, or limit the motion of components of anchor assembly 10 or 10'.

Referring now to FIG. 4, an anchor assembly 110, which may be similar to anchor assembly systems 10 or 10' described above, has an energy absorption system 122 including an anchor 126 movably mounted within a retainer 120 and a lever 144 pivotally mounted to the retainer to selectively limit the motion of anchor 126 when lever 144 is in a first position. Lever 144 is provided with a spring, not shown, to selectively bias lever 144 into a second position out of engagement with anchor 126. A load bearing member 128, extends between a back wall 132 of retainer 120 and an anchor 126 coupled to a top tether 18. Load bearing member 128 is illustrated as a coil spring, but may incorporate an energy absorbing component in parallel or series with a spring or integrated into a spring.

Anchor assembly 110 further has a switch assembly 150, similar to switch assembly 50 described above. Switch assembly 150 includes a retainer 152, a lever 154 pivotally mounted to retainer 152 to selectively hold lever 144 in the first position, an internally formed channel 170 in the direction of vehicular motion, and an inertial switching system 156 disposed in the channel 170. Inertial switching system 156 includes a weight 172 displaceable along channel 170 and a biasing member 174, such as a coil spring, interposed between retainer 152 and weight 172 such as to regulate the travel of displacement of weight 172 along channel 170 in response to deceleration events. Lever 154 includes an arm 176 extending through a slot 178 in retainer 152 into channel 170. Arm 176 is selectively engageable with weight 172 upon sufficient displacement of weight 172 along channel 170. In particular, weight 172 and biasing member 174 are chosen such that, in response to a deceleration event indicative of a collision, weight 172 engages arm 176 such as to pivot lever 154 away from engagement with lever 144, thereby releasing lever 144 to pivot away from the first position and free anchor 126 to be pre-biased by load bearing member 128.

Operation of anchor assembly 110 may be understood with reference to FIGS. 4 through 9.

In FIG. 4, anchor assembly 110 is shown in its initial rest condition, with lever 154 holding lever 144 in the first position and lever 144 with anchor 126 in a pretensioned position relative to retainer 120. In FIG. 5, anchor assembly 110 is shown experiencing a deceleration of the vehicle seat at a rate in below a predetermined deceleration rate indicative of a collision event. In this event, weight 172 is displaced by the deceleration event an insufficient distance to engage lever 154 and therefore inertial switching system 156 does not release anchor 126. It should be noted, however, that while the rearward motion of anchor 156 is limited in the conditions shown in FIGS. 4 and 5, anchor 156 may be displaceable forward in response to an acceleration event against the force of load bearing member 128.

In FIG. 6 anchor assembly 110 is shown experiencing a deceleration of the vehicle seat at a rate above a predetermined deceleration rate indicative of a collision event. This deceleration rate results in displacement of weigh 172 against arm 176 of lever 154 with sufficient force to pivot lever 154 away from engagement with lever 144, thereby releasing lever 144 to pivot away from the first position. Upon retreat of lever 154, anchor 126 is released to be pre-biased by load bearing member 128.

In FIG. 7, anchor 126 is shown experiencing a forward force from top tether 118 which results from inertia of the occupant following an impact deceleration event. Load bearing member 126, which was pre-tensioned in FIG. 6 is now deformed plastically or elastically to absorb the force of the occupant forward movement. An energy absorbing component of the load bearing member may become separated during this phase of operation.

Referring now to FIG. 8, an anchor assembly 210, which may be similar to anchor assembly systems 10, 10' described above except as illustrated and described herein, has an energy absorption system 222 including an anchor 226 reciprocally mounted within a retainer 220 and a lever 244 pivotally mounted to retainer 220 to selectively limit the motion of anchor 226 when lever 244 is in a first position. A load bearing member 228, includes a coil spring 280 extending between a front edge 282 of retainer 220 and an anchor 226 as well as a block of energy absorbing material 284 extending between a back wall 232 of retainer 220 and anchor 226.

Anchor assembly 210 further has a switch assembly 250, similar to switch assembly 50 described above except that a magnetic weight 272 is biased in a rest position in a channel 270 formed in a retainer 232 by a biasing member 274 comprising a magnet. The magnetic properties of weight 272 and biasing member 274 are chosen such that, in response to a deceleration event indicative of a collision, weight 272 overcomes the magnetic force therebetween to permit weight 272 to engage arm 276 such as to pivot lever 254 away from engagement with lever 244, thereby releasing lever 244 to pivot away from a first position limiting the movement of anchor 226, thereby freeing anchor 226 to be pre-biased by load bearing member 228.

Operation of anchor assembly 210 may be understood with reference to FIGS. 8 through 14.

Figure 9:
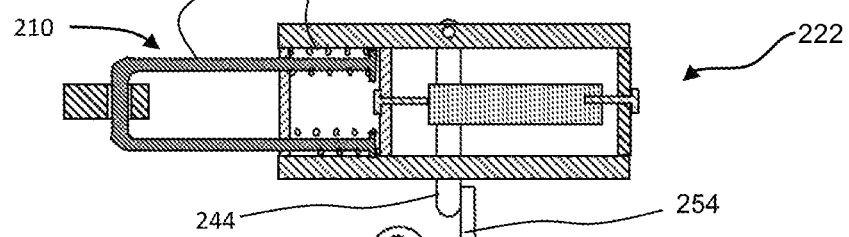
FIG. 9 is a partially schematic cutaway plan view of the anchorage device of FIG. 8, with the anchor displaced and the preload spring partially extended against a force exerted upon the anchor by the vehicle seat.

In FIG. 8, anchor assembly 210 is shown in its initial rest condition, with lever 254 holding lever 244 in the first position and lever 244 limiting the rearward motion of anchor 226 relative to retainer 220. In FIG. 9, anchor assembly 210 is shown experiencing an occupant forward force following a deceleration of the vehicle seat at a rate in below a predetermined deceleration rate indicative of a collision event. In this event, weight 272 experiences deceleration event providing an insufficient force to overcome its attraction to biasing member 274.

Figure 10:
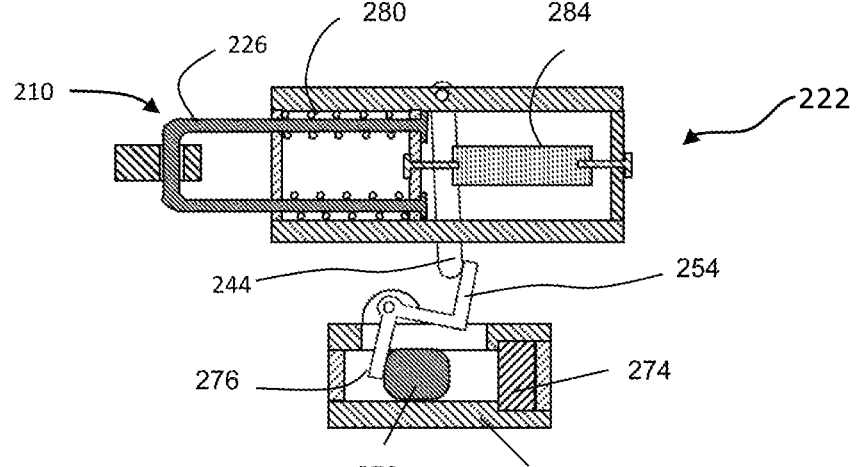
FIG. 10 is a partially schematic cutaway plan view of the anchorage device of FIGS. 8 and 9, with an inertial trigger component partially displaced against the force of a trigger spring into engagement with the inertially operated latch, such as by a deceleration of the vehicle seat at a rate in excess of a predetermined rate.

In FIG. 10 anchor assembly 210 is shown experiencing a deceleration of the vehicle seat at a rate in above a predetermined deceleration rate indicative of a collision event. This deceleration rate results in release of weight 272 by biasing member 274 and engagement of arm 276 of lever 254 with sufficient force to pivot lever 254 away from engagement with lever 244, thereby releasing lever 244 to pivot away from the first position. Upon retreat of lever 254, anchor 226 is released to be pre-biased by load bearing member 228, as shown in FIG. 11.

In FIG. 12, anchor 226 is shown experiencing a forward force from top tether 218 which results from inertia of the occupant following an impact deceleration event. Load bearing member 226, which was pre-tensioned in FIG. 6 is now deformed plastically to absorb the force of the occupant forward movement until the block of energy absorbing material 284 breaks.

In FIG. 13, anchor assembly 210 is shown refracted by coil spring 280 following the occupant forward movement.

Referring now to FIG. 14, an anchor assembly 310, which may be similar to anchor assembly systems 10, 10', 110 or 210 described above except as illustrated and described herein, has an energy absorption system 322 having a load bearing member 328, which includes a coil spring 380 surrounding a block of energy absorbing material 384, with both extending between a back wall 332 of retainer 320 and anchor 326.

It will be appreciated that variations from the above described and illustrated configurations are possible. For example, switch assembly 50, 150, 250, or 350 may be oriented in various other directions relative to retainer 20, 20', 120, 220, or 320, provided that it is oriented in a manner such that the inertial switching system will appropriately respond to deceleration of the vehicle to activate lever 54, 154, 254, or 354 to activate lever 44, 144, 244, or 344. Furthermore, it will be appreciated that alternative actuation components may be substituted for one or both of the levers, such as plungers, to communicate between switch assembly 50, 150, 250, or 350 and energy absorption system 22, 122, 222, or 322. The specific configuration chosen will be dictated by expected loading characteristics, available space, component characteristics such as strength and durability, and any applicable regulations.

It will be appreciated that one or more load bearing deformable members described and various examples have been described or depicted herein. Such deformable members may be resilient, having "memory", wherein the deformable member exhibits the capability of partially or completely rebounding and recovering at least some portion of its initial geometry and load carrying capability after having been distorted. Recovery of such materials may occur unassisted and naturally over time. Recovery may occur nearly instantaneously, or may occur gradually, as desired to achieve intended performance for a given functional application. Alternatively, the rate or the amount of total recovery may be supplemented through the use of spring-like assist features not shown. Similarly, while the flexible return assist components of energy absorption members are depicted as coil springs in the drawings, in practical application such members may also vary in geometry. Such capability may facilitate re-use of the load bearing deformable material, which may enable anchor assembly 10 to function in multiple instances of abrupt vehicle deceleration, in the event of a secondary impact, a rollover, or similar type of vehicle impact condition. High density energy absorption foams, various fiber meshes and other materials such as these further provide rate sensitive load carrying characteristics, wherein rapid loading results in effectively stiffening the material. With materials of this nature, the rate of recovery may differ from the rate of loading. Thus, it will be appreciated that various forms of deformable material can be employed, depending upon the desired performance result.

Further, it should also be noted that such materials may be mounted in a manner so that they are used in compression or used in expansion or both. Alternatively, deformable members may instead be configured to manage energy by twisting, rotating or uncoiling relative to an axis, or by distorting one or more contact surfaces relative to another member of the device as a result of an interference condition between at least one moveable member and another fixed or moveable member, wherein the deformable member itself may be either fixed or moveable. Deformable members may be configured to be disposed within or external to retainer 20.

The components of the anchor assembly 10 may be comprised of composite, metallic, or alternative material compositions suitable to satisfy functional performance requirements for an energy management restraint anchor assembly and maintain compliance to various automotive standards. Anchor assembly 10 or subassemblies thereof may also be configured for inspection and adaptation for re-use by replacing the load bearing deformable member 214 with new material. An indicator may be included to inform the occupant the anchor assembly 10 has been deployed. It will further be appreciated that while a single energy management anchor assembly 10 is shown in FIG. 1 in the context of being used with a top tether anchor arrangement interfacing with a child seat, a plurality of said devices may also be employed to further provide energy management restraint capability for lower anchor attachments.

The words used herein are words of description and not words of limitation. Those skilled in the art will recognize that various modifications may be made to the systems and methods disclosed without departing from the scope and spirit of the invention as set forth in the appended claims.

The invention claimed is:

1. An inertial lock system for use with an anchorage system for at least one vehicle child seat, the inertial lock system comprising:
    a retainer;
    an anchor slidably connected to the retainer;
    at least one energy storing component connected between the retainer and the anchor biasing the anchor in a first direction;
    at least one energy absorbing component connected between the retainer and the anchor capable of absorbing energy transmitted between the anchor and the retainer when the anchor is displaced in a second direction opposite the first direction;
    a retention switch component selectively engageable with the anchor to limit the movement of the anchor in the first direction; and
    an inertial switch selectively operable in response to a predetermined deceleration of the retainer in the second direction to selectively release the retention switch and to thereby permit the at least one energy storing component to be displaced in the first direction; wherein:

the retainer has a plurality of walls defining a channel and the anchor is displaceable at least partially within the channel; and the retainer has at least a partial back wall, the anchor is displaceable in the channel in the first direction towards the back wall, and the energy storing component is a spring extended between the back wall and the anchor, which spring is maintained in tension by the retention switch component.

2. The inertial lock system of claim 1, wherein the at least one energy storing component and the at least one energy absorbing component are mounted between the retainer and the anchor in a parallel configuration.

3. The inertial lock system of claim 1 wherein the energy absorbing component and the energy storing component are disposed in the channel.

4. The inertial lock system of claim 1 wherein the energy absorbing component is extended between the anchor and the back wall.

5. The inertial lock system of claim 1 wherein the retainer has at least a partial front wall, the anchor is displaceable in the first direction away from the front wall, and the energy storing component is a spring extended between the front wall and the anchor, which spring is maintained in compression by the retention switch component.

6. The inertial lock system of claim 5 wherein the retainer further has at least a partial back wall, the anchor is displaceable in the first direction towards the back wall, and the energy absorbing component is extended between the back wall and the anchor.

7. The inertial lock system of claim 1 wherein the retention switch is a first lever pivotably mounted to the retainer.

8. The inertial lock system of claim 7 wherein the inertial switch comprises a second retainer, an inertial component movably retained by the second retainer, and a second lever pivotably mounted to the retainer and engageable with the first lever, the second lever being selectively movable by the inertial component away from engagement with the first lever in response to the displacement of the inertial component when the inertial component experiences a deceleration in the second direction in excess of a predetermined rate.

9. The inertial lock system of claim 1 wherein the inertial switch comprises a second retainer, an inertial component movably retained by the second retainer, and an actuator movably mounted to the retainer and engageable with the retention switch and selectively movable by the inertial component away from engagement with the retention switch in response to the displacement of the inertial component when the inertial component experiences a deceleration in the second direction in excess of a predetermined rate.

10. The inertial lock system of claim 1 further comprising a child car seat and a top tether interconnecting the child car seat to the anchor.

11. An inertial lock system for use with an anchorage system for at least one vehicle child seat, the inertial lock system comprising:

a first retainer;

an anchor slidably connected to the first retainer;

at least one energy managing device connected between the first retainer and the anchor and biasing the anchor in a first direction;

a first lever pivotably mounted to the first retainer and selectively engageable with the anchor to limit the movement of the anchor in the first direction;

a second retainer;

a second lever pivotably mounted to the second retainer and selectively engageable with the anchor to limit the movement of the anchor in the first direction; and an inertial component movably associated with the second retainer and operable, in response to a predetermined deceleration of the retainer in the second direction, to selectively pivot the second lever from engagement with the first lever and to thereby permit the at least one energy managing device to be displaced in the first direction.

12. The inertial lock system of claim 11 wherein the energy managing device comprises an energy storing device.

13. The inertial lock system of claim 11 wherein the energy managing device comprises an energy absorbing device.

14. The inertial lock system of claim 11 wherein the energy managing device comprises a load bearing deformable member.

15. The inertial lock system of claim 11 wherein the energy managing device comprises at least one energy storing device.

16. The inertial lock system of claim 11 wherein the inertial device is a weight secured to the second retainer by a spring and responds to a deceleration event by extending the spring.

17. The inertial lock system of claim 11 wherein the inertial device is a first magnetic component responsive to a second magnetic component associated with the second retainer to be displaced against the magnetic force between the magnetic components in response to a deceleration event.

18. A method of balancing the load experienced by the top tether of a child car seat comprising:

attaching a top tether to an anchor that is within a retainer;

attaching an inertial switch to a switch assembly; and pretensioning the top tether in response to a predetermined rate of vehicle deceleration such that, when the predetermined rate of deceleration occurs, the inertial switch causes a lever to release the anchor within the retainer, thereby releasing the pretensioned top tether;

wherein:

the retainer has a plurality of walls defining a channel and the anchor is displaceable at least partially within the channel; and the retainer has at least a partial back wall, the anchor is displaceable in the channel in the first direction towards the back wall, and an energy storing device, connected between the retainer and the anchor, is a spring extended between the back wall and the anchor, which spring is maintained in tension by the retention switch component.

19. An inertial lock system for use with an anchorage system for at least one vehicle child seat, the inertial lock system comprising:

a retainer;

an anchor slidably connected to the retainer;

at least one energy storing component connected between the retainer and the anchor biasing the anchor in a first direction;

at least one energy absorbing component connected between the retainer and the anchor capable of absorbing energy transmitted between the anchor and the retainer when the anchor is displaced in a second direction opposite the first direction;

a retention switch component selectively engageable with the anchor to limit the movement of the anchor in the first direction; and an inertial switch selectively operable in response to a predetermined deceleration of the retainer in the second direction to selectively release the retention switch and to thereby permit the at least one energy storing component to be displaced in the first direction; and the retainer has a plurality of walls defining a channel and the anchor is displaceable at least partially within the channel;

wherein:

the retainer has at least a partial front wall, the anchor is displaceable in the first direction away from the front wall, and the at least one energy storing component is a spring extended between the front wall and the anchor, which spring is maintained in compression by the retention switch component; and the retainer further has at least a partial back wall, the anchor is displaceable in the first direction towards the back wall, and the at least one energy absorbing component is extended between the back wall and the anchor.

20. An inertial lock system for use with an anchorage system for at least one vehicle child seat, the inertial lock system comprising:

a retainer;

an anchor slidably connected to the retainer;

at least one energy storing component connected between the retainer and the anchor biasing the anchor in a first direction;

at least one energy absorbing component connected between the retainer and the anchor capable of absorbing energy transmitted between the anchor and the retainer when the anchor is displaced in a second direction opposite the first direction;

a retention switch component selectively engageable with the anchor to limit the movement of the anchor in the first direction; and an inertial switch selectively operable in response to a predetermined deceleration of the retainer in the second direction to selectively release the retention switch and to thereby permit the at least one energy storing component to be displaced in the first direction;

wherein:

the retention switch is a first lever pivotably mounted to the retainer; and the inertial switch comprises a second retainer, an inertial component movably retained by the second retainer, and a second lever pivotably mounted to the retainer and engageable with the first lever, the second lever being selectively movable by the inertial component away from engagement with the first lever in response to the displacement of the inertial component when the inertial component experiences a deceleration in the second direction in excess of a predetermined rate.

21. An inertial lock system for use with an anchorage system for at least one vehicle child seat, the inertial lock system comprising:

a retainer;

an anchor slidably connected to the retainer;

at least one energy storing component connected between the retainer and the anchor biasing the anchor in a first direction;

at least one energy absorbing component connected between the retainer and the anchor capable of absorbing energy transmitted between the anchor and the retainer when the anchor is displaced in a second direction opposite the first direction;

a retention switch component selectively engageable with the anchor to limit the movement of the anchor in the first direction; and an inertial switch selectively operable in response to a predetermined deceleration of the retainer in the second direction to selectively release the retention switch and to thereby permit the at least one energy storing component to be displaced in the first direction;

wherein the inertial switch comprises a second retainer, an inertial component movably retained by the second retainer, and an actuator movably mounted to the retainer and engageable with the retention switch and selectively movable by the inertial component away from engagement with the retention switch in response to the displacement of the inertial component when the inertial component experiences a deceleration in the second direction in excess of a predetermined rate.

* * * * *